United States Patent [19]

Dauplaise et al.

[11] Patent Number: 5,093,091

[45] Date of Patent: Mar. 3, 1992

[54] METHOD OF REMOVING IRON FROM CONCENTRATED ALUM SOLUTIONS

[75] Inventors: David L. Dauplaise; Wei S. Yen, both of Norwalk, Conn.

[73] Assignee: American Cyanamid Company, Stamford, Conn.

[21] Appl. No.: 286,108

[22] Filed: Dec. 19, 1988

[51] Int. Cl.$^5$ .......................... C01G 49/00; C01F 7/00
[52] U.S. Cl. ..................................... 423/112; 423/111; 423/122; 423/556; 423/DIG. 14; 423/139
[58] Field of Search ............... 423/556, 111, 112, 122, 423/DIG. 14, 139; 266/168

[56] References Cited

U.S. PATENT DOCUMENTS

| | | | |
|---|---|---|---|
| 1,252,648 | 6/1918 | Barnett et al. | 423/556 |
| 2,416,508 | 2/1947 | Barnes | 423/556 |
| 3,211,521 | 10/1965 | George et al. | 423/556 |
| 3,331,662 | 7/1967 | Feller | 423/556 |
| 3,479,136 | 11/1969 | Michner et al. | 423/556 |
| 3,586,477 | 6/1971 | Flood | 423/556 |
| 4,767,540 | 8/1988 | Spitzer et al. | 423/121 |

FOREIGN PATENT DOCUMENTS

| | | | |
|---|---|---|---|
| 3706736 | 2/1988 | Fed. Rep. of Germany | 423/556 |
| 279604 | 7/1975 | U.S.S.R. | 423/556 |

Primary Examiner—Michael Lewis
Assistant Examiner—Steven Bos
Attorney, Agent, or Firm—Frank M. van Riet

[57] ABSTRACT

Iron is removed from concentrated alum solutions by contacting said solutions with a polymer containing hydroxamic acid or salt groups.

11 Claims, No Drawings

METHOD OF REMOVING IRON FROM CONCENTRATED ALUM SOLUTIONS

BACKGROUND OF THE INVENTION

Almost all the alum produced today is manufactured from bauxite or bauxitic or other clays which are found primarily in Ala., Ark., Ga., Mo., Jamaica, Guyana, Surinam, other South American countries and in Asia. Alumina-bearing ores are usually mined by open pit methods, crushed, calcined, ground and shipped to the alum manufacturing plant. At the plant, the ore is charged, together with the required amount of sulfuric acid, into digesters, where, after several hours at elevated temperature, the reaction is completed as represented by the following equation:

$$Al_2O_3 + 3H_2SO_4 + 11H_2O \rightarrow Al_2(SO_4)_3 + 14H_2O$$

One of the most important uses for alum is in the manufacture of paper. Alum is used to improve drainage, retain fines, set rosin and control pH and also to enhance the value of resin additives. Alum is also used in the paper-making process to control pitch, prevent foam and improve the properties of broken and secondary fibers. Proper application and control of the alum level employed increases machine production and can reduce the input of many other chemical additives.

Alum solutions, made according to the method discussed above, almost always contain varying amounts of iron impurities, usually depending upon the type and origin of the ore. These iron impurities, when present at high levels, impart undesirable discoloration to paper when used in the preparation thereof and, in addition, they can catalyze the decomposition of bleaching agents used in the production of white paper stock. Several patents have issued which are directed to the production of iron-free alum (aluminum sulfate), see U.S Pat. No. 4,039,615 and 4,244,928, however, none of these procedures have proven commercially suitable for the manufacture of technical grade alum for use in paper-making processes.

The process of the present invention is designed to more effectively remove iron from concentrated alum solutions. The improvement forming the basis of the present invention lies in adding and efficiently mixing a polymer containing hydroxamic acid groups into the concentrated alum solution, preferably after having subjected the solution to oxidation, either chemically or through aeration, to convert the $Fe^{2+}$ iron to the $Fe^{3+}$ species, thus forming an insoluble polymer-iron complex which can be separated from the alum by decantation. This treatment leads to reduced levels of iron in the concentrated alum solutions when compared with state-of-the-art processes, as exemplified by the patents mentioned above. Such reductions in iron enable the alum solution to be utilized in the manufacture of paper, especially white stock, free of the undesirable discoloration normally attendant the presence of iron in said solutions.

Hydroxamated polymers are well known to these skilled in the art and are specifically disclosed, as are methods for their production, in Japanese Pat. No. 18,865/65; European Patent Application 104,970; U.K. Patent Application 2171127 and U.S. Pat. Nos. 3,345,344; 4,480,067; 4,532,046; 4,536,296 and 4,587,306, hereby incorporated herein by reference.

These polymers are known to be chelating agents for iron, as well as many other polyvalent metal ions, as disclosed in various of those U.S. patents set forth above, as well as articles by Kern et al, Synthetic Macromolecular Substances with Reactive Groups; Angew, Chem. 69; 153-171; 1957; and Winston et al; Polym. News; 10; 6-12; 1984; and Jour of Polymer Sci.; 14; 2155-2165; 1976; and 2131-2143; 1984; and Macromolecules; 1978; 11; 597-603 and 1981; 14; 538-543 and Polymer News; 10 6-12, 1984. Monomeric hydroxamic acids are taught as extractants in U.S. Pat. Nos. 3,821,351; 3,900,551 and 4,474,742. None of these references, however, teach the removal of iron from concentrated alum solutions using hydroxamic acid or salt group containing polymers. The fact that the hydroxamated polymers, which can, in principle, bind both iron and aluminum, preferentially remove low concentrations of iron from essentially saturated, strongly acidic solutions of aluminum is an unexpected finding.

DETAILED DESCRIPTION OF THE INVENTION INCLUDING PREFERRED EMBODIMENTS

In accordance with the present invention, there is provided a process for the removal of iron from aqueous concentrated alum solutions which comprises oxidizing the iron contained in said solution and adding to the resultant oxidized iron containing solution a water-soluble polymer containing pendant hydroxamic acid or salt groups and having a molecular weight of at least about 100,000 in an amount effective to settle said oxidized iron therein.

The oxidation of the iron in the alum solution is accomplished chemically by contacting the solution with any known oxidizing agent such as, for example, hydrogen peroxide, sodium hypochlorite, ammonium persulfate, sodium perborate and the like in amounts such as to oxidize substantially all of the $Fe^{2+}$ iron to the $Fe^{3+}$ iron species or by aeration, whereby oxygen is contacted with the $Fe^{2+}$ iron per se or in an aqueous media.

Generally, the hydroxamated polymers may be produced by reacting a pendant reactive group of a polymer, in solution, with a hydroxylamine or its salt at a temperature ranging from about 50° C. to 100° C. for several hours or more. From about 1–90% of the available pendant reactive groups of the polymer may be replaced by hydroxamic groups in accordance with said procedures.

In addition to the reaction of a hydroxylamine or its salt with a polymer solution, it has been found that hydroxamation may be effected whereby a polymer latex is reacted directly with hydroxylamine or its salt. The latex may be, e.g., a copolymer of acrylamide and methyl acrylate or a copolymer of acrylic acid and methyl acrylate. In this case, the hydroxylamine or its salt reacts primarily with the ester groups to form hydroxamic acid groups.

Also, it has been found that inverse emulsions made of, for example, aqueous polyacrylamide or acrylamide/acrylic acid copolymers dispersed in oil can be reacted directly with a hydroxylamine or its salt to give very high molecular weight polymers containing hydroxamic acid groups, all of which function efficiently in the process of the present invention.

The degree of hydroxamation, i.e., the concentration of units of the formula:

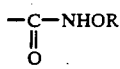

wherein R is hydrogen or a cation, in the polymers useful herein, may range from about 30 to about 90 mole percent, preferably from about 30 to about 75 mole percent and, most preferably, from about 40 to about 75 mole percent.

Suitable hydroxylamine salts include the sulfates, sulfites, phosphates, perchlorates, hydrochlorides, acetates, propionates of hydroxylamine and the like. The pH of the solution is preferably adjusted to about 3-9, preferably over about 6.0, by means of acid or base addition to the solution.

The polymer to be employed in the present invention can vary rather broadly in type. It should, however, be sufficiently stable to be effective under the conditions used, e g , acidic conditions.

Thus, for example, any water-soluble hydroxamic acid or salt group-containing polymer may be used in the process of the present invention. The useful polymers can best be exemplified by those containing pendant groups of the Formula (I), above. These polymers can be derived from polymers containing pendant ester, amide, anhydride, nitrile, etc., groups by the reaction thereof with hydroxylamine or its salt.

Exemplary of the polymers which may be hydroxamated for use in the process of the present invention are acrylic, methacrylic, crotonic etc., acid ester polymers such as polymers produced from the polymerization of methyl acrylate, ethyl acrylate, t-butyl acrylate, methyl methacrylate, ethyl methacrylate, cyclohexyl methacrylate, N,N-dimethylaminoethyl methacrylate, N,N-dimethylaminoethyl acrylate, methyl crotonate, etc., polymers of maleic anhydride and esters thereof, and the like; nitrile polymers such as those produced from acrylonitrile etc; amide polymers such as those produced from acrylamide, methacrylamide and the like.

Thus, homopolymers, copolymers, terpolymers, etc. of the monomers exemplified above may be used. Suitable comonomers which, by copolymerization, may form for, example, up to about 95 mole percent of the polymers useful herein can include acrylic acid, sodium acrylate, methacrylic acid, vinyl acetate, N-vinyl pyrrolidone, butadiene, styrene as well as mixtures of the above enumerated esters, amides and/or nitriles and the like as is known in the art and as set forth in the above-incorporated patents as long as such copolymers, terpolymers etc., are water-soluble after hydroxamation. The molecular weight of the polymers useful in the process of the present invention must be at least about $1\times 10^5$, preferably $2\times 10^5$ to about $1\times 10^7$. Lower molecular weight polymers have been found to be unacceptable in that they form alum-soluble complexes which are difficult to remove.

Alternatively, any of the monomers disclosed above which are reactive with the hydroxylamine or its salt may be reacted therewith before polymerization to result in the hydroxamated polymer, which may then be treated as discussed herein, before being used to contact the alum solution.

The polymers use in the present invention are employed by adding them, usually in the form of a dilute aqueous solution, to the concentrated alum solution containing iron dispersed throughout, in an amount at least sufficient to settle said suspended iron. Generally, for best results, a dosage of at least about 1000 ppm of the hydroxamated polymer should be employed. Aqueous solutions of up to about 10.0%, preferably from about 0.1 to about 3.0%, of hydroxamated polymer may be employed at the above dosages.

It is understood, that higher amounts than those just stated may be employed without departing from the scope of the invention, although generally a point is reached in which additional amounts of hydroxamated polymer do not improve the separation rate over already achieved maximum rates. Thus, it is uneconomical to use excessive amounts when this point is reached.

The hydroxamated polymer used in the instant process is preferably rendered free of hydroxylamine or its salt before use. It has been found that the presence of the hydroxylamine or its salt deleteriously interferes with the precipitation of the iron from the alum solution with the hydroxamated polymer. The hydroxylamine and/or its salt and lower molecular weight polymer fraction may be removed from the hydroxamated polymer before use in the instant process by subjecting the as produced hydroxamated polymer to the action of a dialysis membrane, with an appropriate molecular weight cut-off, for from 8 hours to 5 days in continuous flow deionized water and recovering the resultant polymer such as by concentration and/or freeze drying.

The iron complexes, being water-insoluble as formed on contact with the hydroxamated polymer, are removed from the alum solution after settling such as by filtration, decantation, centribugation etc.

Before removal of the flocculated iron, a known flocculant can be added to the alum solution to aid in the settling of the iron-polymer precipitate. Such flocculants as polydiallyldimethylammonium chloride; polyamine; polyacrylamide; polyvinyl chloride; polyethyleneoxide and the like may be used for this purpose in amounts ranging from about 2 parts per million to about 1000 parts per million.

The following examples are set forth for purposes of illustration only and are not to be construed as limitations on the present invention except as set forth in the appended claims. All parts and percentages are by weight unless otherwise specified.

EXAMPLE A

In a suitable reaction vessel, 200 parts of a 100% aqueous solution of polyacrylamide having a molecular weight of about 200,000 are reacted with 60.1 parts of hydroxylamine sulfate in the presence of 30 parts of sodium acetate for 5 hours at 80° C. and an additional 2 hours at 100° C. A solution containing 7.8% polymer containing 64% hydroxamic acid groups (by Carbon -13 NMR analysis) is recovered.

EXAMPLE 1

100 Parts of a commercial grade alum solution containing 900 ppm of iron is treated with 0.2 parts of 30% hydrogen peroxide solution to oxidize the ferrous species to the ferric oxidation state. The solution is stirred for two minutes and the hydroxamated polymer of Example A, or others of different molecular weight prepared as in Example A, are added, either in the form of a 2% aqueous solution or an 8% aqueous solution, to the resultant alum solution so that the dosage rate is 5000 ppm. The mixture is allowed to stand for 10 hours and the resultant clear solution obtained is filtered and analyzed for iron content. The values reported are normalized to account for the dilution resulting from the addition of the hydroxamated polymer (HYPA) solution. The results are set forth in Table I, below.

TABLE I

Iron Removal from Alum Solution

| | | Final Fe Conc. | |
|---|---|---|---|
| Example | HYPA Molecular Wt. | 2% HYPA | 8% HYPA |
| 1C | 10K | 240* | 330* |
| 2 | 130K | 360 | 800 |
| 3 | 200K | 300 | 660 |
| 4 | 300K | 330 | 820 |
| 5 | 900K | 410 | 810 |
| 6C | 10K** | — | 850 |

\* = colored solution formed
\*\* = 10–15% hydroxamation
C = Comparative

The results of Table I show the substantial reduction in iron concentration using the hydroxamated polymers of the present invention, especially at the 2% dosage level, the polymers having a low degree of hydroxamation i.e., 10–15%, (Example 6-C) however, showing substantially no efficiency while Example IC, results in an undesirable colored solution.

EXAMPLES 7–14

A 3% aqueous solution of the hydroxamated polymer of Example A is reprecipitated from methanol to remove inorganic salts and placed in a dialysis membrane tubing having a molecular weight cutoff of 2000. The membrane tubing is allowed to stand in contact with continuous flow deionized water for 1–3 days after which the polymer solution is concentrated and freeze-dried to a white solid. This dialyzed HYPA is used to remove iron from an alum solution according to the procedure of Example 1. The results are set forth in Table II, below.

TABLE II

| | Final Fe Conc. (ppm) | |
|---|---|---|
| Example | Dialyzed | Undialyzed |
| 8% HYPA Sol. | | |
| 7 | 200k m.w. | 740 | 660 |
| 8 | 300k m.w. | 820 | 820 |
| 9 | 900K m.w. | 850 | 810 |
| 2% HYPA Sol. | | |
| 10 | 200K m.w. | 190 | 300 |
| 11 | 250k m.w. | 110 | — |
| 12 | 300k m.w. | 120 | 330 |
| 13 | 900k m.W. | 80 | 410 |
| 14 | 900k m.w. | 470* | — |

*extraneous hydroxylamine added.

The results shown in Table II demonstrate the greatly improved efficiency of dialyzed HYPA, added at the 2% concentration level. The beneficial results of dialysis is further demonstrated by the substantial increase in iron concentration of the alum solution treated with a 900,000 molecular weight HYPA to which extraneous hydroxylamine is added.

EXAMPLES 15–19

Following the procedure of Example 1, alum solutions containing 930 ppm and 520 ppm of iron, respectively, are treated at 60° C. with a 2% solution of the hydroxamated polymer of Example 11 containing only 0.2% of residual hydroxylamine. The results are set forth in Table III, below.

TABLE III

| Example | HYPA dosage (ppm) | Residual Hydroxylamine | Final Fe Conc. (ppm) | |
|---|---|---|---|---|
| | | | (orig. 930 ppm) | |
| 15 | 3000 | 27% (added) | 750 | |
| 16 | 3000 | 0.2% | 420 | |
| 17 | 5000 | 0.2% | 290 | |
| | | | (orig. 520 ppm) | |
| | | | 25° C. | 60° C. |
| 18 | 3000 | 25% (added) | 379 | 511 |
| 19 | 3000 | 0.2% | 168 | 265 |

As can be appreciated, Table III clearly points out the adverse effect if residual hydroxylamine.

EXAMPLES 20–23

Again following the procedure of Example 1, an alum solution containing 900 ppm of iron is treated with the dialyzed polymer of Example 9 at a dosage rate of 5000 ppm using varying concentrations of hydroxamated polymer. The results are set forth in Table IV, below.

TABLE IV

| Example | HYPA Conc. (%) | Final Fe Conc. (ppm) |
|---|---|---|
| 20 | 8 | 810 |
| 21 | 6 | 690 |
| 22 | 4 | 200 |
| 23 | 2 | 80 |

The efficacy of the hydroxamated polymer increases drastically with decreasing solution concentration at constant dosage.

EXAMPLES 24–31

Following the procedure of Example A, various hydroxamated polymers are prepared, dialyzed as in Exs. 7–14 and utilized to remove iron from alum solutions as in Example 1. In each instance, excellent results are achieved. The results are set forth in Table V, below.

| Example | Hydroxamated Polymer (% hydroxamation) | Molecular Weight |
|---|---|---|
| 24 | 92 AM/8AA (32%) | 88,000 |
| 25 | 92 AM/8AA (43%) | 420,000 |
| 26 | 70 AM/30 MAA (61%) | 15,000,000 |
| 27 | 50 AM/50 EA (74%) | 8,000,000 |
| 28 | 75 AA/25 MA (61%) | 2,000,000 |
| 29 | 90 AM/10 DMAEA (90%) | 800,000 |
| 30 | 50 MA/50 MVE (37%) | 110,000 |
| 31 | PAN (11%) | 130,000 |

AM = acrylamide
AA = acrylic acid
MAA = methacrylic acid
EA = ethylacrylate
MA = methyl acrylate
DMAEA = dimethylaminoethyl acrylate
MVE = methylvinyl ether
PAN = polyacrylonitrile It is understood that mixtures of two or more hydroxamic acid-containing polymers of the present invention may be used together without departing form the spirit of the present invention, and that combinations of the hydroxamic acid-containing polymers of the present invention with other reagents may also be used together and remain within the scope hereof.

EXAMPLES 32–47

Two (2) aqueous polymer solutions are prepared the first of which is:

I. Polyacrylamide of 50 m.w., being 73% hydroxamated, and 14.39% as the sodium salt and having 29.2% solids.

II. Acrylamide/acrylic acid (90/10/) copolymer of 200,000 m.w. being 59.6% hydroxamated, and 21.2.% carboxylated and having 30.2% solids.

One (1) gram of Solution I is added to 99 grams of distilled water to yield a 1% as is solution of 0.292% solids (Sample I).

0.5 Gram of Solution I is added to 99.5 grams of distilled water to yield a 0.5% as is solution of 0.146% solids (Sample II).

One (1) gram of Solution II is added to 99 grams of distilled water to yield a 1% as is solution of 0.302% solids (Sample III).

0.5 Gram of Solution II is added to 99.5 grams of distilled water to yield a 0.5% as is solution of 0.151 solids (Sample IV).

The four (4) samples are then utilized to treat an alum solution containing 700 ppm $Fe^{3+}$ and 40 ppm $Fe^{2+}$ for the removal of iron therefrom, in conjunction with 0.1 ml of $H_2O_2$. The results are set forth in Table V, below.

TABLE V

| Example | Sample ml | Sample lb/t | Iron Content (ppm) | Residual Iron (ppm) | % Removal |
|---|---|---|---|---|---|
| | I | | | | |
| 32 | 6.25 | 3.65 | 740 | 708 | 4.32 |
| 33 | 12.50 | 7.30 | 740 | 700 | 5.41 |
| 34 | 25.00 | 14.60 | 740 | 600 | 18.92 |
| 35 | 50.00 | 29.20 | 740 | 500 | 32.43 |
| | II | | | | |
| 36 | 6.25 | 1.83 | 740 | 776 | — |
| 37 | 12.50 | 3.65 | 740 | 750 | — |
| 38 | 25.00 | 7.30 | 740 | 720 | 2.70 |
| 39 | 50.00 | 14.60 | 740 | 600 | 18.92 |
| | III | | | | |
| 40 | 6.25 | 3.78 | 740 | 630 | 14.86 |
| 41 | 12.50 | 7.55 | 740 | 650 | 12.16 |
| 42 | 25.00 | 15.10 | 740 | 555 | 25.00 |
| 43 | 50.00 | 30.20 | 740 | 360 | 51.35 |
| | IV | | | | |
| 44 | 6.25 | 1.88 | 740 | 776 | — |

TABLE V-continued

| Example | Sample ml | Sample lb/t | Iron Content (ppm) | Residual Iron (ppm) | % Removal |
|---|---|---|---|---|---|
| 45 | 12.50 | 3.775 | 740 | 750 | — |
| 46 | 25.00 | 7.55 | 740 | 690 | 6.75 |
| 47 | 50.00 | 15.10 | 740 | 580 | 21.65 |

We claim:

1. A process for the removal of iron from concentrated aluminum sulfate solutions which comprises oxidizing the iron contained in said aluminum sulfate solution and adding to the resultant oxidized iron containing solution a water-soluble polymer containing pendant hydroxamic acid or salt groups said polymer having a molecular weight of at least about 100,000 in an amount effective to settle said oxidized iron therein.

2. The process of claim 1 wherein an extraneous flocculating agent is added to said oxidized iron containing solution subsequent to said polymer addition.

3. The process according to claim 1 wherein the degree of hydroxamation of said polymer is at least about 30%.

4. The process according to claim 1 wherein the degree of hydroxamation of said polymer is at least about 30% and the polymer is free of hydroxylamine.

5. A process according to claim 1 wherein said polymer is derived by hydroxamating a polymer containing pendant ester, amide, anhydride or nitrile groups.

6. A process according to claim 5 wherein said polymer is derived by hydroxamating an amide polymer.

7. A process according to claim 5 wherein said polymer is derived by hydroxamating an acrylamide polymer.

8. A process according to claim 5 wherein said polymer is derived by hydroxamating an ester polymer.

9. A process according to claim 8 wherein said polymer is derived by hydroxamating an acrylate or methacrylate polymer.

10. A process according to claim 1 wherein the degree of hydroxamation of said polymer ranges from about 40 to about 75%.

11. A process according to claim 1 wherein the molecular weight of said polymer ranges from about $2 \times 10^5$ to about $1 \times 10^7$.

* * * * *